(12) United States Patent
Ushida (10) Patent No.: US 8,078,021 B2
(45) Date of Patent: Dec. 13, 2011

(54) WAVEGUIDE CONNECTING STRUCTURE

(75) Inventor: Jun Ushida, Tokyo (JP)

(73) Assignee: NEC Corporation, Tokyo (JP)

( * ) Notice: Subject to any disclaimer, the term of this patent is extended or adjusted under 35 U.S.C. 154(b) by 350 days.

(21) Appl. No.: 12/519,693

(22) PCT Filed: Dec. 12, 2007

(86) PCT No.: PCT/JP2007/073941
§ 371 (c)(1),
(2), (4) Date: Jun. 17, 2009

(87) PCT Pub. No.: WO2008/078561
PCT Pub. Date: Jul. 3, 2008

(65) Prior Publication Data
US 2010/0092132 A1    Apr. 15, 2010

(30) Foreign Application Priority Data

Dec. 27, 2006    (JP) ................. 2006-351587

(51) Int. Cl.
G02B 6/26 (2006.01)
G02B 6/42 (2006.01)
(52) U.S. Cl. ............... 385/31; 385/28; 385/45; 385/50
(58) Field of Classification Search ............ 385/27, 385/28, 31, 39, 42, 43, 45, 50
See application file for complete search history.

(56) References Cited

U.S. PATENT DOCUMENTS

| 6,049,644 A | 4/2000 | Dragone |
| 7,519,257 B2 * | 4/2009 | Lipson et al. ............. 385/126 |
| 2006/0228074 A1 | 10/2006 | Lipson |

FOREIGN PATENT DOCUMENTS

| JP | 1995168148 A | 7/1995 |
| JP | 1998221554 A | 8/1998 |
| JP | 2000221345 A | 8/2000 |
| JP | 2005275064 A | 10/2005 |
| JP | 2005326876 A | 11/2005 |
| JP | 2006146127 A | 6/2006 |
| JP | 2006329680 A | 12/2006 |
| WO | 2004081627 A | 9/2004 |

OTHER PUBLICATIONS

International Search Report for PCT/JP2007/073941 mailed Jan. 15, 2008.

(Continued)

Primary Examiner — Kevin S Wood (57) ABSTRACT

A waveguide connecting structure includes a light branching element (111) for branching light from an input optical waveguide (201) including one core into two branched light components having the same optical power and the same phase, and a twin-arm waveguide (113) including a pair of arm waveguides (113A, 113B) for outputting the light components branched by the light branching element to a slot waveguide (202) including two cores arranged in parallel at a narrow spacing. The pair of arm waveguides have cores formed in a cladding on a substrate and having a refractive index higher than that of the cladding, and are formed such that the spacing between them gradually narrows and becomes equal to the core spacing of the slot waveguide from the core input ends into which the branched light components enter toward the core output ends from which the light components are output to the slot waveguide.

4 Claims, 10 Drawing Sheets

OTHER PUBLICATIONS

T. Shoji et al., "Low loss mode size converter from 0.3 μm square Si wire waveguides to singlemode fibres", Electronics Letters, vol. 38, Dec. 5, 2002, p. 1669-1670.

M. Yanagisawa et al., "Low-Loss and Large-Tolerance Fiber Coupling of High-Δ Silica Waveguides by Local Mode-Field Conversion", IEEE Photonics Technology Letters, vol. 4, No. 4, Apr. 1993, p. 433-435.

A. Gomyo et al., "Low Optical Loss Connection for Photonic Crystal Slab Waveguides", IEICE Trans. Electron., vol. E87-C, Mar. 2004, p. 328-335.

J. Ushida et al., "Immittance matching for multidimensional open-system photonic crystals", Physical Review B 68, 2003, p. 155115-1 to 7.

V. R. Almeida et al., "Guiding and confining light in void nanostructure", Optics Letters, vol. 29, No. 11, Jun. 1, 2004, p. 1209-1211.

Ning-Ning Feng et al., "Lossless strip-to-slot waveguide transformer", Optics Letters, vol. 32, No. 10, May 15, 2007, p. 1250-1252.

R. J. Bozeat et al., "Silicon Based Waveguides", Silicon Photonics, 2004, p. 269-274.

S. Noda, et al., "Roadmap on Photonic Crystals", Kluwer Academic Publishers, 2003, p. 45-49.

* cited by examiner

WAVEGUIDE CONNECTING STRUCTURE

This application is the National Phase of PCT/JP2007/073941, filed Dec. 12, 2007, which is based upon and claims priority from Japanese Patent Application No. 2006-351587 filed Dec. 27, 2006.

TECHNICAL FIELD

The present invention relates to a connecting structure between dissimilar waveguides in a micro-optical circuit and, more particularly, to a connecting structure from a strip waveguide to a slot waveguide.

BACKGROUND ART

The research and development of micro-optical circuits are being extensively made in optical communication systems using waveform multiplexing. When an optical device using an optical waveguide made of materials having a large refractive index difference is achieved, a lower-cost, lower-power-consumption optical communication apparatus than the conventional apparatuses can be implemented. Also, the developed optical device element technologies are applicable to optical interconnections on an LSI chip or between chips, and expected as means for avoiding various technical difficulties resulting from the increase in transmission capacitance of the conventional electrical interconnections.

Representative examples of the optical waveguide using materials having a large refractive index difference are a ridge waveguide using Si as a waveguide core on an SOI (Silicon on Insulator) substrate as described in Japanese Patent Laid-Open No. 7-168146, a rib waveguide, a strip waveguide, and a photonic crystal line defect waveguide. In addition, the research and development are being extensively made on an optical waveguide using a compound semiconductor such as GaAs as described in Japanese Patent Laid-Open No. 10-221554.

The optical waveguides as described above have functions of devices in some cases, and are often used as optical interconnecting elements connecting functional elements such as light emitting elements, light receiving elements, light branching elements, light coupling elements, optical demultiplexing elements, optical multiplexing elements, light modulating elements, optical switching elements, optical memory elements, and optical buffer elements integrated on a micro-optical circuit. From this viewpoint, smooth conversion and low-loss connection of an electromagnetic field mode propagating in a waveguide in a portion connecting a waveguide and various functional elements or in a portion connecting waveguides different in material or size are extremely important in every optical device having an optical waveguide.

From this point of view, the connection of two types of strip waveguides (including an optical fiber connecting spot size converter) (e.g., T. Shoji et al., Electronics Letters, vol. 38 (2002). pp. 1669-1670, M. Yanagisawa et al., IEEE Photonics Technology Letters, vol. 4 (1993) pp. 433-435, and Japanese Patent Laid-Open Nos. 7-168146, 10-221554, 2006-146127, 2005-326876, and 2005-275064), and the connection of a strip waveguide and photonic crystal line defect waveguide (see, e.g., A. Gomyo et al., IEICE Trans. Electron., Vol. E87 (2004) pp. 328-335, J. Ushida et al. Phys. Rev. B68, (2003) pp. 155115-1 to 7, and International Application WO2004/081627) have conventionally been researched and developed, and various connecting structures have been examined and proposed.

DISCLOSURE OF INVENTION

Problem To Be Solved By the Invention

Unfortunately, the conventional techniques as described above cannot be applied to the connection to a slot waveguide, because the connecting structures as objects of research and development are those of a rib waveguide, ridge waveguide, strip waveguide, and photonic crystal line defect waveguide.

The slot waveguide is a new waveguide structure proposed in V. R. Almeida et al., Opt. Lett., 29 (2004) pp. 1209-1211. In this structure, the field strength between two waveguides arranged in parallel at a narrow spacing is high, so the electric field is confined in a low-index region. Accordingly, the slot waveguide have an electric field component distribution and electromagnetic wave energy distribution largely different from those of the conventional waveguides, so the conventional connecting structure cannot directly be applied to the slot waveguide.

The present invention has been made to solve the above problem, and has as its object to provide a waveguide connecting structure capable of connecting a conventional optical waveguide to a slot waveguide including two waveguides arranged in parallel at a narrow spacing.

Means of Solution to the Problem

To achieve the above object, a waveguide connecting structure according to the present invention includes a light branching element which branches light from an input optical waveguide including one core into two branched light components having the same optical power and the same phase, and a twin-arm waveguide including a pair of arm waveguides which output the light components branched by the light branching element to a slot waveguide including two cores arranged in parallel at a narrow spacing, wherein the pair of arm waveguides have cores formed in a cladding on a substrate and having a refractive index higher than that of the cladding, and are formed such that a spacing between the pair of arm waveguides gradually narrows and becomes equal to a core spacing of the slot waveguide, from core input ends into which the branched light components enter toward core output ends from which the light components are output to the slot waveguide.

Effect of the Invention

In the present invention, the pair of arm waveguides forming the twin-arm waveguide have the cores formed in the cladding on the substrate and having a refractive index higher than that of the cladding, and are formed such that the spacing between the pair of arm waveguides gradually narrows and becomes equal to the core spacing of the slot waveguide, from the core input ends into which the branched light components enter toward the core output ends from which the light components are output to the slot waveguide.

Accordingly, an electromagnetic field guided to each arm waveguide is confined in a high-index region, but an electromagnetic field mode can gradually be changed to a low-index region of the slot waveguide by the twin-arm waveguide. This enables low-loss, smooth electromagnetic field mode conversion.

BEST MODE FOR CARRYING OUT THE INVENTION

Exemplary embodiments of the present invention will be explained below with reference to the accompanying drawings.

[Slot Waveguide]

Figure 1A:
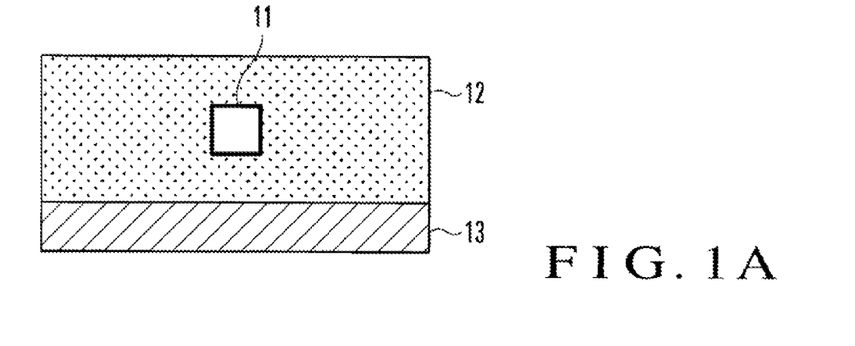
FIG. 1A is a sectional view showing a conventional waveguide.
Figure 1B:
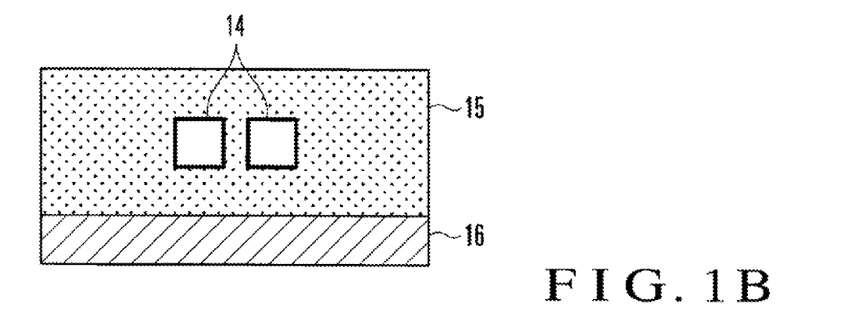
FIG. 1B is a sectional view showing a conventional slot waveguide.

First, the structure of a slot waveguide will be explained in detail below with reference to FIGS. 1A and 1B. FIGS. 1A and 1B are sectional views respectively showing a conventional waveguide and the slot waveguide.

FIG. 1A is a sectional view showing the conventional waveguide called a strip waveguide or wire waveguide. This waveguide includes a cladding 12 formed on a substrate 13, and a core 11 embedded in the cladding 12 and having a rectangular or almost rectangular section. In this arrangement, the refractive index in the region of the core 11 is made higher than that in the region of the cladding 12, thereby confining light in the core region by this refractive index difference, and propagating an electromagnetic field by a propagation mode having a real wave number in a direction perpendicular to the drawing surface.

On the other hand, FIG. 1B is a sectional view showing the slot waveguide. The slot waveguide has a structure in which two waveguides shown in FIG. 1A are arranged in parallel at a narrow spacing as a whole, and includes a cladding 15 formed on a substrate 16, and two cores 14 embedded in the cladding 15 and having a rectangular or almost rectangular section. An $SiO_2$ (refractive index=about 1.5) material having a relatively low refractive index is used as the cladding 15, and an Si (refractive index=about 3.5) material having a relatively high refractive index is used as the cores 14. As the substrate 16, it is possible to use a general substrate material capable of forming an optical waveguide, e.g., an insulator material such as glass or plastic, or a semiconductor material such as Si or GaAs.

Figure 2:
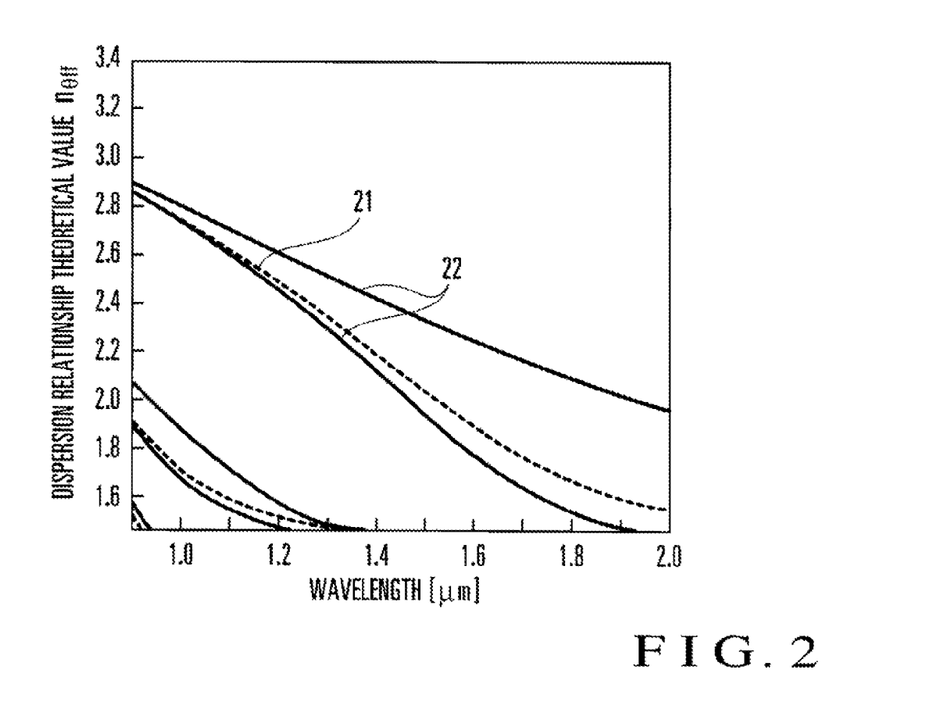
FIG. 2 is a graph showing the dispersion relationship between a strip waveguide and the slot waveguide.

The dispersion relationship of the slot waveguide will be explained below with reference to FIG. 2. FIG. 2 is a graph showing the dispersion relationship between the strip waveguide and slot waveguide. Referring to FIG. 2, the abscissa is the wavelength [μm] of light propagating in the waveguide, and the ordinate is a theoretical value indicating the dispersion relationship of light propagating in the waveguide.

A curve 21 indicated by the dotted line in FIG. 2 shows the dispersion relationship of the strip waveguide (Si in $SiO_2$, a square section of 300 nm side) having the sectional structure as shown in FIG. 1A, and this dispersion relationship satisfies the single-mode conditions at a communication wavelength band of 1,550 nm. On the other hand, a curve 22 indicated by the solid line in FIG. 2 shows the dispersion relationship of the slot waveguide having the sectional structure as shown in FIG. 1B in which the two strip waveguides are coupled in parallel.

Figure 3A:
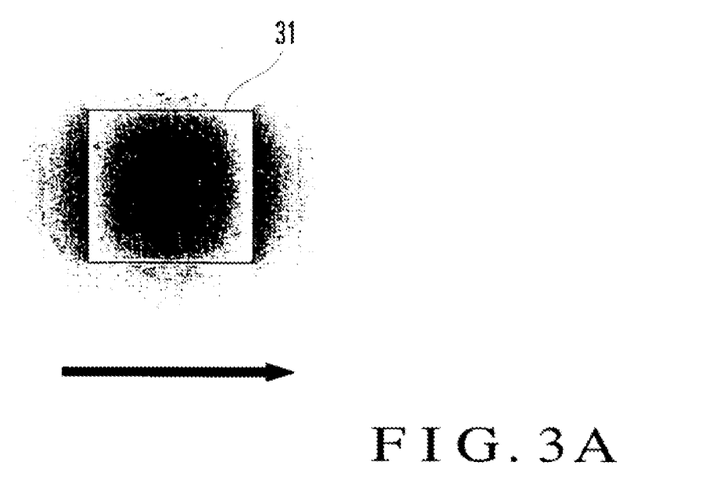
FIG. 3A is a view showing an electric field distribution pertaining to the 0th mode of the strip waveguide.
Figure 3B:
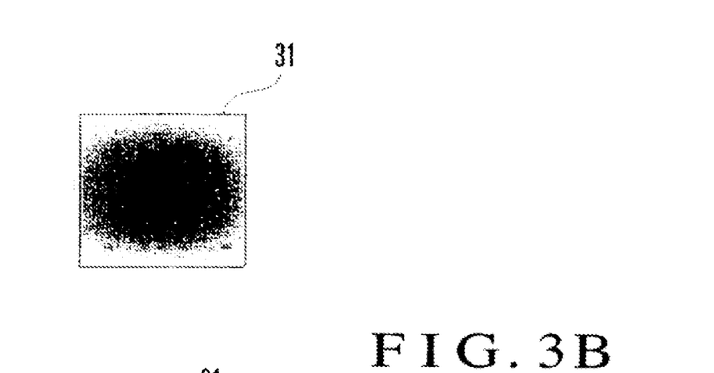
FIG. 3B is a view showing an electromagnetic field energy distribution pertaining to the 0th mode of the strip waveguide.
Figure 4A:
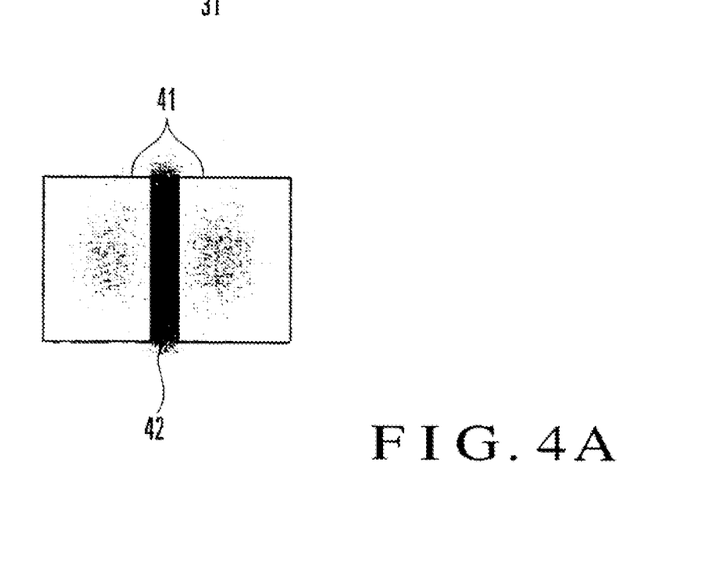
FIG. 4A is a view showing the electric field component distribution of the 0th mode of the slot waveguide.
Figure 4B:
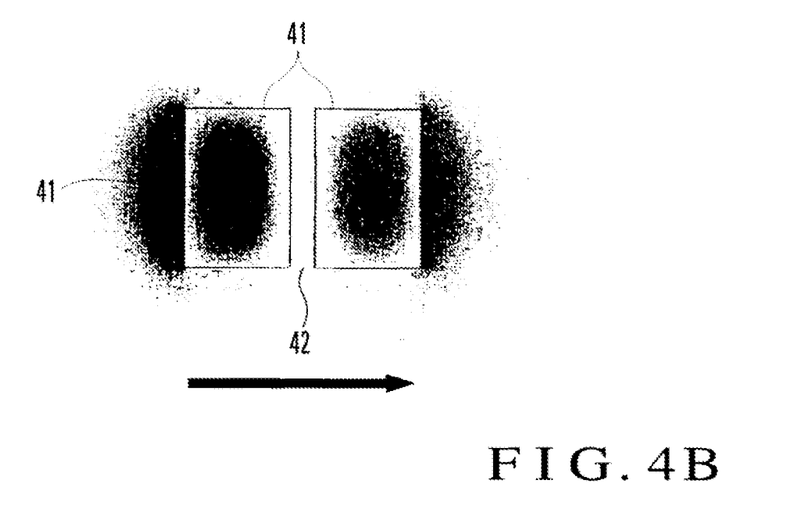
FIG. 4B is a view showing the electric field component distribution of the first mode of the slot waveguide.
Figure 5A:
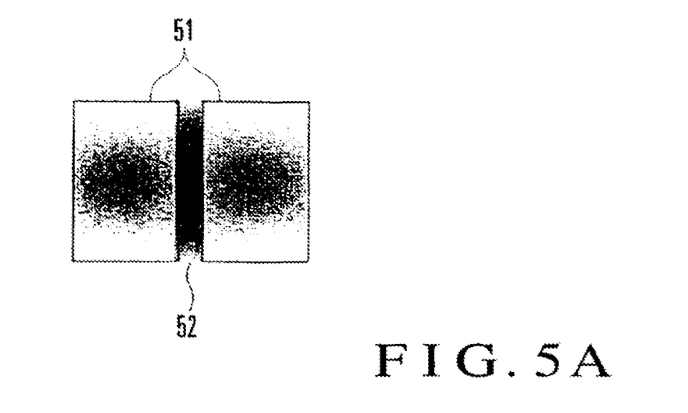
FIG. 5A is a view showing the electromagnetic field energy density distribution of the 0th mode of the slot waveguide.
Figure 5B:
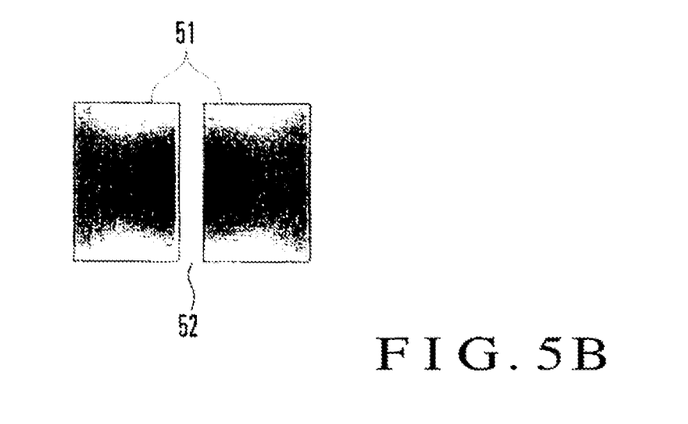
FIG. 5B is a view showing the electromagnetic field energy density distribution of the first mode of the slot waveguide.

An electric field component distribution and electromagnetic wave energy distribution concerning the slot waveguide will be explained below with reference to FIGS. 3A to 5B. FIGS. 3A and 3B are views respectively showing an electric field distribution and electromagnetic field energy distribution pertaining to the 0th mode of the strip waveguide. FIGS. 4A and 4B are views respectively showing the electric field component distributions of the 0th and first modes of the slot waveguide. FIGS. 5A and 5B are views respectively showing the electromagnetic field energy density distributions of the 0th and first modes of the slot waveguide.

As described previously, in the strip waveguide as indicated by the electric field component distribution in the direction of the arrow shown in FIG. 3A and the electromagnetic wave energy distribution shown in FIG. 3B, most of the electromagnetic field strength is in a core 31 and the electromagnetic field energy is also confined in the region of the core 31.

On the other hand, in the slot waveguide, the 0th-mode electric field component in the direction of the arrow shown in FIG. 4A strongly distributes in a slot 42 (a low-index portion) between two cores 41 when compared to the first-mode electric field component distribution in the direction of the arrow shown in FIG. 4B. Also, the 0th-mode electromagnetic wave energy shown in FIG. 5A strongly distributes in a slot 52 (a low-index portion) between two cores 51 when compared to the first-mode electromagnetic wave energy distribution shown in FIG. 5B.

From the foregoing, the key of the present invention is to convert an electromagnetic field distributing in a high-index portion of a waveguide as shown in FIGS. 3A and 3B into an electromagnetic field distributing in a low-index portion as shown in FIGS. 4A and 4B or 5A and 5B, when connecting an electromagnetic field of the waveguide mode in the conventional strip waveguide shown in FIG. 1A to the slot waveguide as a new waveguide shown in FIG. 1B.

First Exemplary Embodiment

Figure 6A:
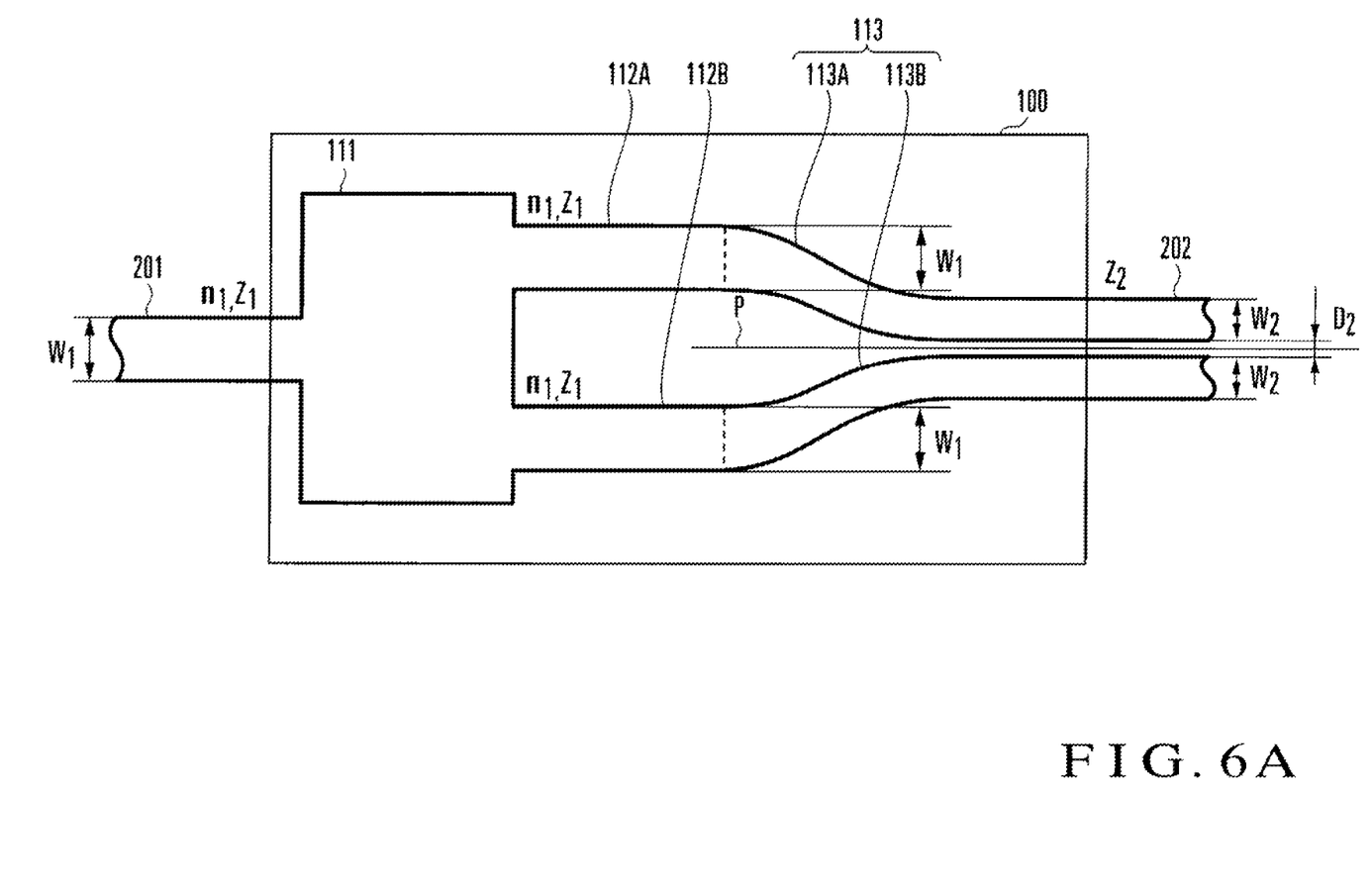
FIG. 6A is a plan view showing a waveguide connecting structure according to the first exemplary embodiment of the present invention.
Figure 6B:
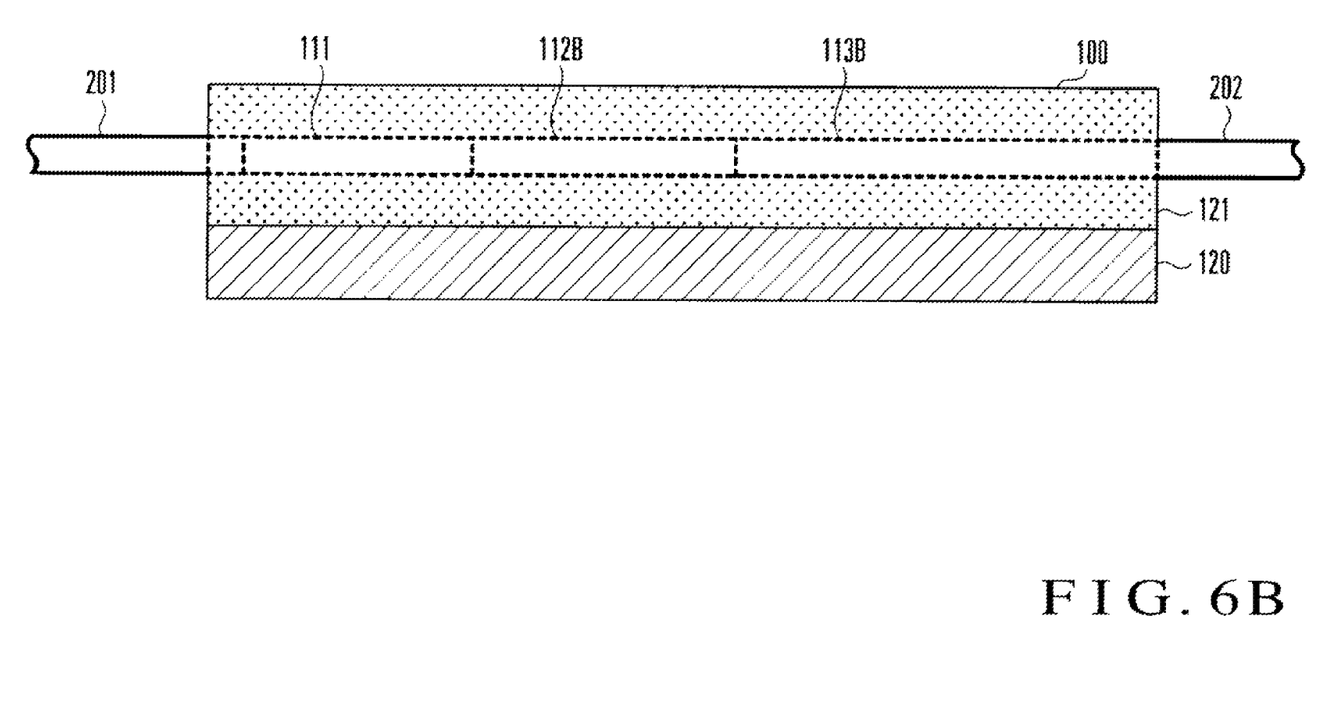
FIG. 6B is a front view showing the waveguide connecting structure according to the first exemplary embodiment of the present invention.

A waveguide connecting structure according to the first exemplary embodiment of the present invention will be explained below with reference to FIGS. 6A and 6B. FIGS. 6A and 6B are views showing the waveguide connecting structure according to the first exemplary embodiment of the present invention. FIG. 6A is a plan view, and FIG. 6B is a front view.

A waveguide connecting structure 100 is a waveguide connecting structure connecting an input optical waveguide (strip waveguide) 201 including one core and a slot waveguide 202 including two cores arranged in parallel at a narrow spacing $D_2$. The waveguide connecting structure 100 includes an MMI (Multi-mode Interference) element 111, strip waveguides 112A and 112B, and a twin-arm waveguide 113.

The MMI element 111 is an optical element having a function of branching an electromagnetic field mode passing through the input waveguide 201 into the two strip waveguides 112A and 112B at an optical power branching ratio of 50:50 such that the branched light components have the same phase. The MMI element 111 is made of a core formed in a cladding 121 on a substrate 120 and having a refractive index higher than that of the cladding 121. The core of the MMI element 111 has a rectangular sectional shape, and the width of the core input end and that of each of the two core output ends of the MMI element 111 are equal to a core width $W_1$ of the core output end of the input waveguide 201. Note that the MMI element 111 can be formed by using the known technique.

The strip waveguides 112A and 112B are optical waveguides having a function of guiding the two branched light components equally branched by the MMI element 111 to the twin-arm waveguide 113. The strip waveguides 112A and 112B each have a refractive index distribution $n_1$ and waveguide impedance $Z_1$ equal to those of the input waveguide 201, and are made of cores formed in the cladding 121 on the substrate 120 and having a refractive index higher than that of the cladding 121. The cores of the strip waveguides 112A and 112B each have a rectangular sectional shape, have a predetermined height from the core input end to the core output end, and have a predetermined core width $W_1$ equal to that of the core output ends of the input waveguide 201 and MMI element 111.

The twin-arm waveguide 113 is an optical waveguide including a pair of arm waveguides 113A and 113B, and having a function of guiding the light components from the strip waveguides 112A and 112B to the slot waveguide 202. The arm waveguides 113A and 113B are made of cores formed in the cladding 121 on the substrate 120 and having a refractive index higher than that of the cladding 121.

The arm waveguides 113A and 113B are formed such that the spacing between them gradually narrows and becomes equal to a core spacing $D_2$ of the slot waveguide 202, from the core input ends into which the branched light components enter toward the core output ends from which the light components are output to the slot waveguide 202. Also, the arm waveguides 113A and 113B are formed to be axially symmetrical with respect to a center P of the slot waveguide, and respectively curved into an S shape and inverse S shape.

The cores of the arm waveguides 113A and 113B have a predetermined height from the core input ends to the core output ends. In addition, the core input ends of the cores of the arm waveguides 113A and 113B have the core width $W_1$ equal to that of the core output ends of the input waveguide 201 and MMI element 111, and the core output ends of the cores of the arm waveguides 113A and 113B have a core width $W_2$ equal to that of the core of the slot waveguide 202. Accordingly, the core width of the arm waveguides 113A and 113B gradually changes from the core width $W_1$ to the core width $W_2$ from the core input ends toward the core output ends. $W_2$ is preferably 80% or less of $W_1$. Note that the core width may also gradually change from the core width $W_1$ to the core width $W_2$ within the range from the core input ends of the arm waveguides 113A and 113B to the portion where the spacing between the arm waveguides 113A and 113B becomes equal to the core spacing $D_2$ of the slot waveguide 202.

In the waveguide connecting structure 100, therefore, the electromagnetic field mode passing through the input waveguide 201 is branched through the MMI element 111 into the two strip waveguides 112A and 112B at a power branching ratio of 50:50 such that the branched light components have the same phase. After that, the light components of the two strip waveguides 112A and 112B are connected to the slot waveguide 202 by the twin-arm waveguide 113.

As described previously, the refractive index distribution of the slot waveguide 202 differs from that of the input waveguide 201, and a waveguide impedance $Z_2$ also differs from $Z_1$. Although the electromagnetic fields guided from two strip waveguides 112A and 112B are confined in the high-index region, the twin-arm waveguide 113 changes the electromagnetic field mode to the low-index region of the slot. waveguide 202. This enables low-loss, smooth electromagnetic field mode conversion.

A narrow waveguide such as the arm waveguides 113A and 113B is not practically used as a single waveguide because the leak of an electromagnetic field to the low-index region is too large and the propagation loss increases. However, the arm waveguides 113A and 113B are used as a twin-arm waveguide structure instead of a single waveguide, and hence have a new function because the loss can be decreased. Accordingly, the operation principle and function of the twin-arm waveguide 113 are essentially entirely different from those of the tapered structure of a single waveguide for use in spot size conversion.

Although a directional coupler is a conventional element in which two waveguides are arranged, the two waveguides of the directional coupler are generally obtained by combining two waveguides in a size region in which each individual waveguide is operable, or arranging these two waveguides at an equal spacing and weakly coupling them such that they can be handled by the perturbation theory. Therefore, the operation principle and function of the directional coupler are essentially different from those of the structure of the twin-arm waveguide 113 of the present invention which achieves the function by gradually changing the spacing or width of waveguides that cannot singly be used.

Figure 7:
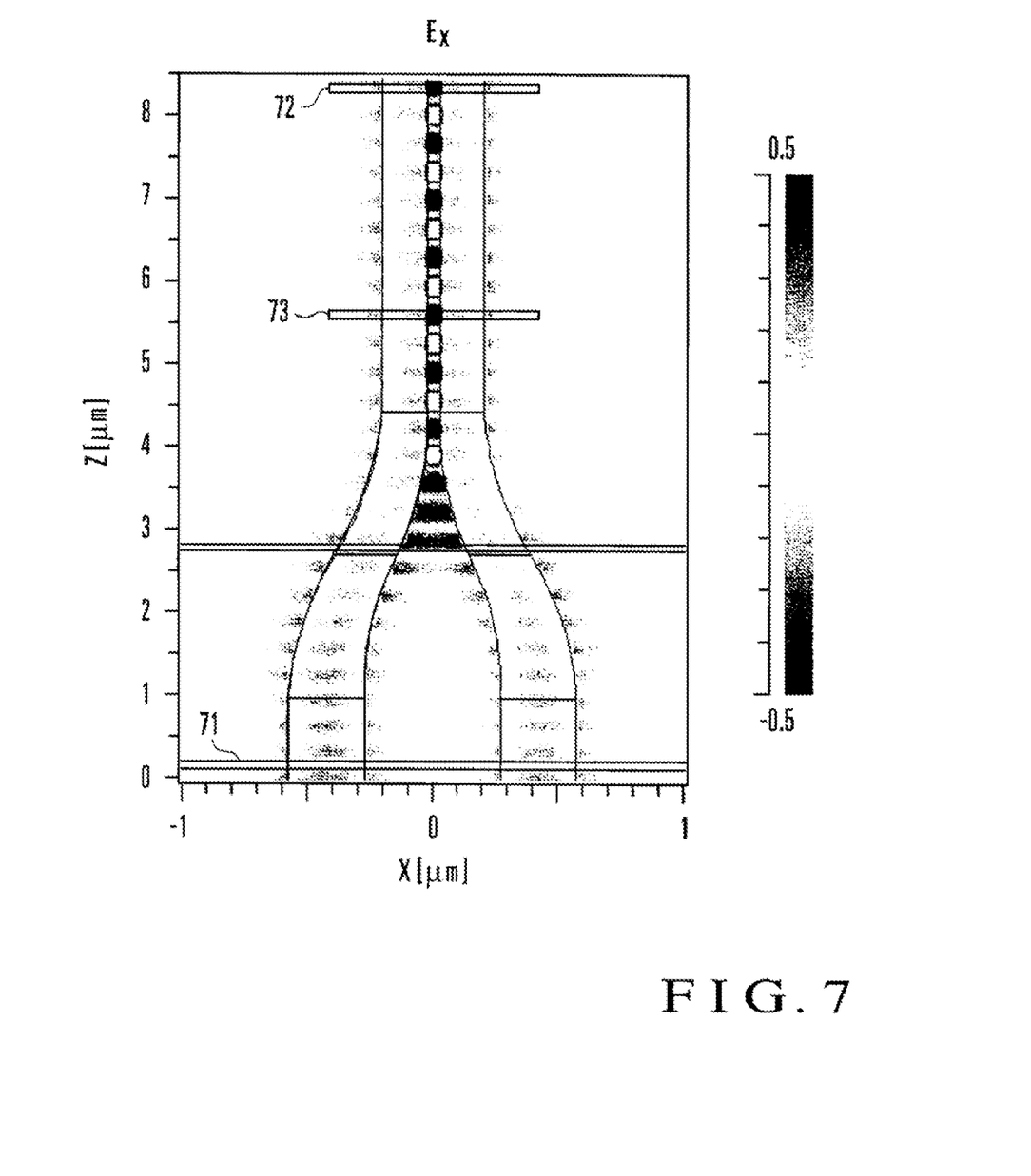
FIG. 7 is a view showing the distribution of a horizontal component of a magnetic field in the connecting structure according to the first exemplary embodiment of the present invention.
Figure 8:
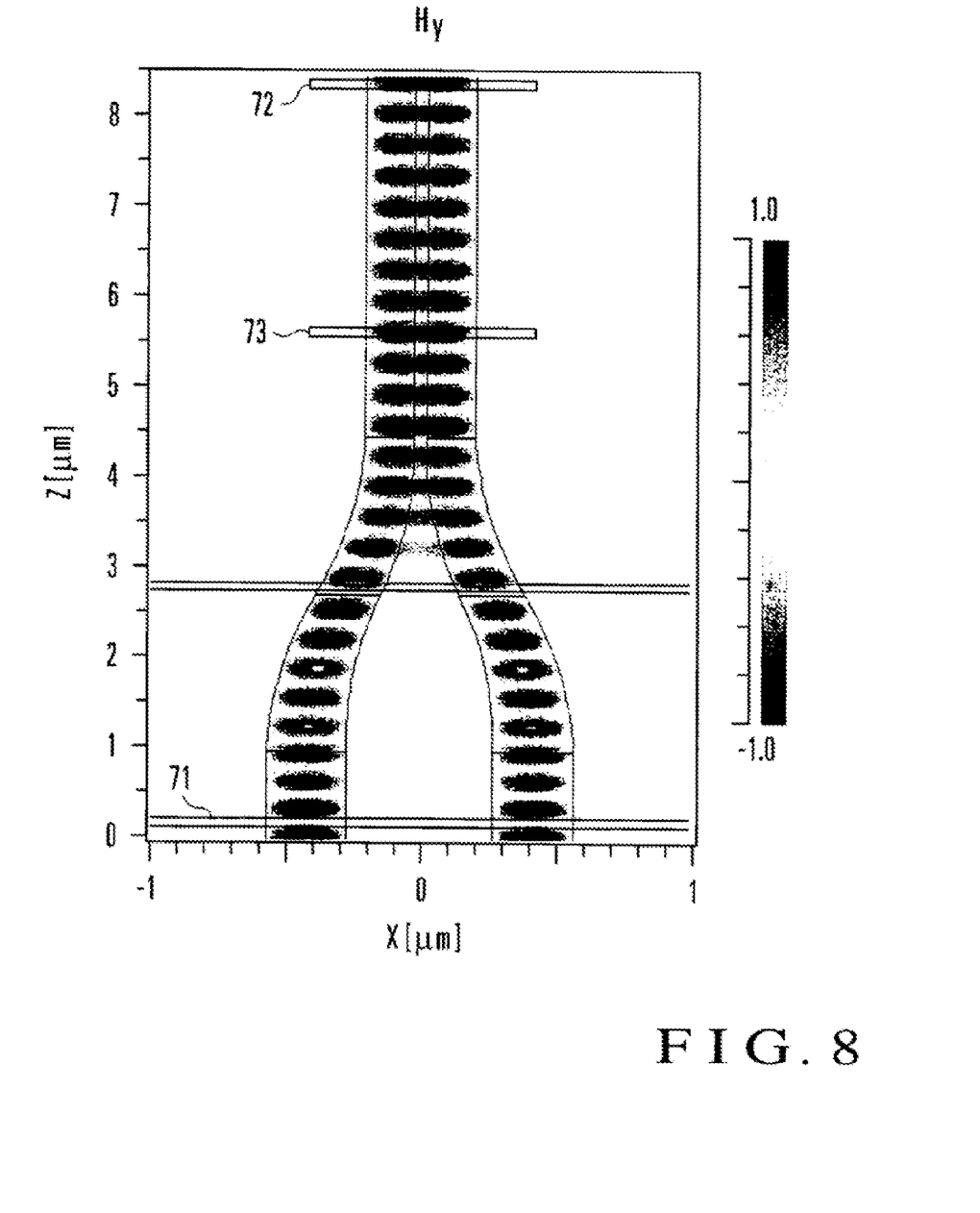
FIG. 8 is a view showing the spatial distribution of that component of a magnetic field which is perpendicular to the drawing surface in the connecting structure according to the first exemplary embodiment of the present invention.

The results of the simulation of electromagnetic field propagation performed on the connecting structure according to this exemplary embodiment by numerical calculations will be explained below with reference to FIGS. 7 and 8. FIG. 7 is a view showing the distribution of a horizontal component of an electric field in the connecting structure according to the first exemplary embodiment of the present invention. FIG. 8 is a view showing the spatial distribution of that component of a magnetic field which is perpendicular to the drawing surface in the connecting structure according to the first exemplary embodiment of the present invention.

When two propagating light components branched through the MMI element 112 and passing through the two strip waveguides 112A and 112B propagate from coordinate Z=0 (71 in FIG. 7) toward Z>0, the distribution of a horizontal component of an electric field is as shown in FIG. 7, and the spatial distribution of that component of a magnetic field which is perpendicular to the drawing surface is as shown in FIG. 8.

FIG. 7 reveals that the electromagnetic field modes from the two strip waveguides 112A and 112B change as the twin-arm waveguide 113 installed in Z=1 to 4.5 (μm) gradually changes the electric field distribution from a high-index core region to a low-index region (73 in FIG. 7). FIG. 8 shows the state in which the magnetic field distribution spreads over the entire region in this case. That is, the electromagnetic field modes smoothly change from the two strip waveguides 112A and 112B toward the slot waveguide 202.

Figure 9:
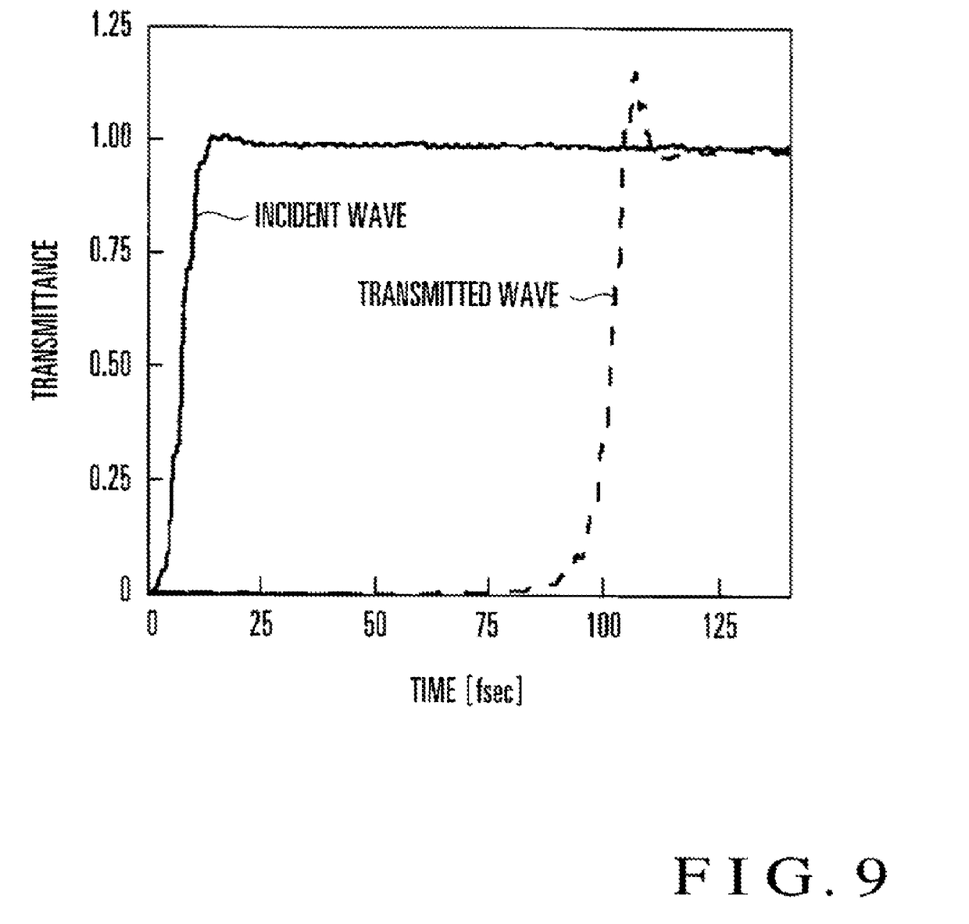
FIG. 9 shows calculation results indicating the transmittance of the connecting structure according to the first exemplary embodiment of the present invention.

FIG. 9 shows calculation results indicating the transmittance of the connecting structure according to the first exemplary embodiment of the present invention.

Assuming that the total sum of the energies of electromagnetic fields passing through the two strip waveguides 112A and 112B crossing Z=0 indicated by 71 in FIG. 7 is 1 when the light propagates by the electromagnetic field distributions as shown in FIGS. 7 and 8, FIG. 9 plots the transmittance in a position 72 of an electromagnetic field having entered the connected twin-arm waveguide 113. As shown in FIG. 9, for an incident energy of 1 of the incident wave, the transmitted energy of the transmitted wave is also 1. This demonstrates that the input waveguide 201 can be connected very efficiently to the slot waveguide 202.

Second Exemplary Embodiment

Figure 10A:
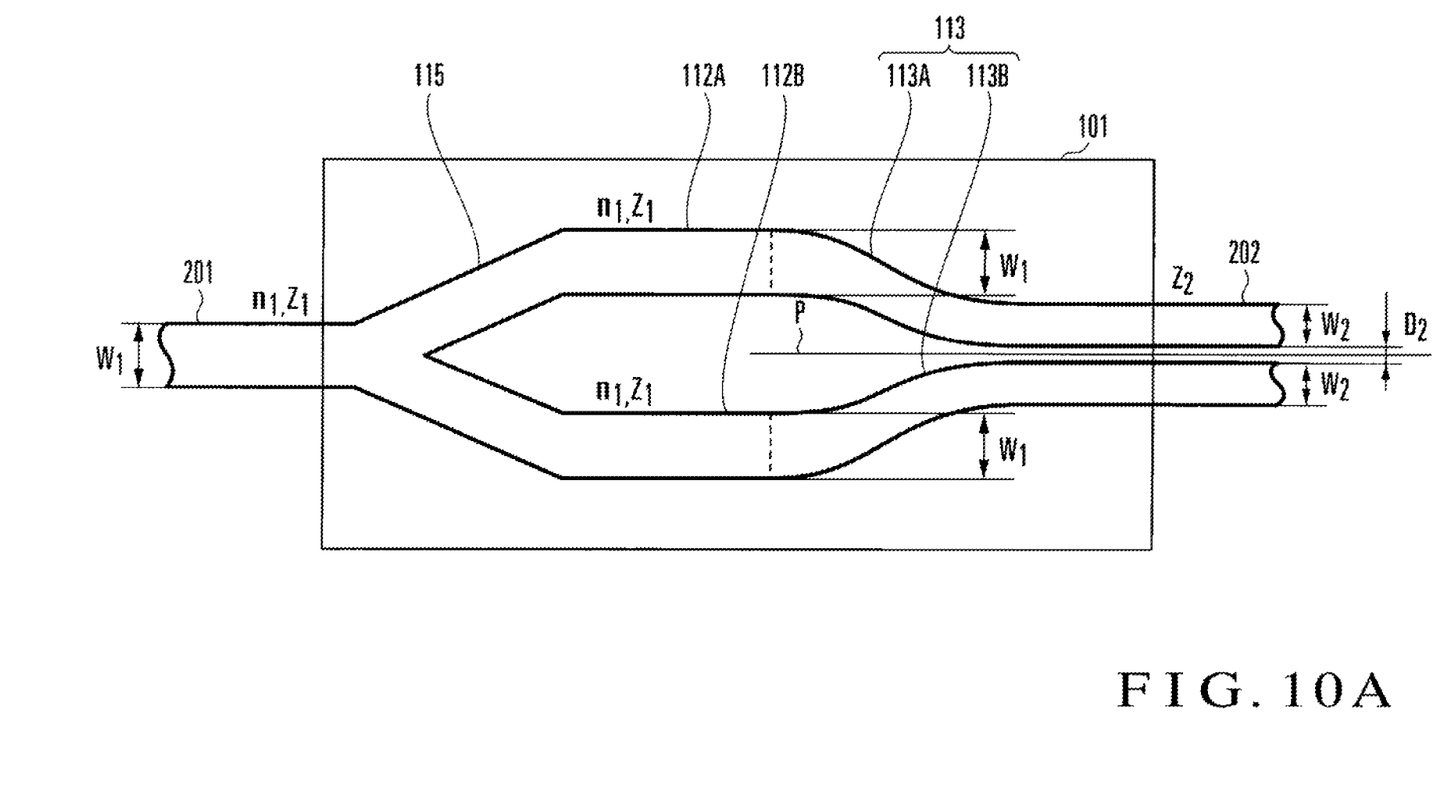
FIG. 10A is a plan view showing a waveguide connecting structure according to the second exemplary embodiment of the present invention.
Figure 10B:
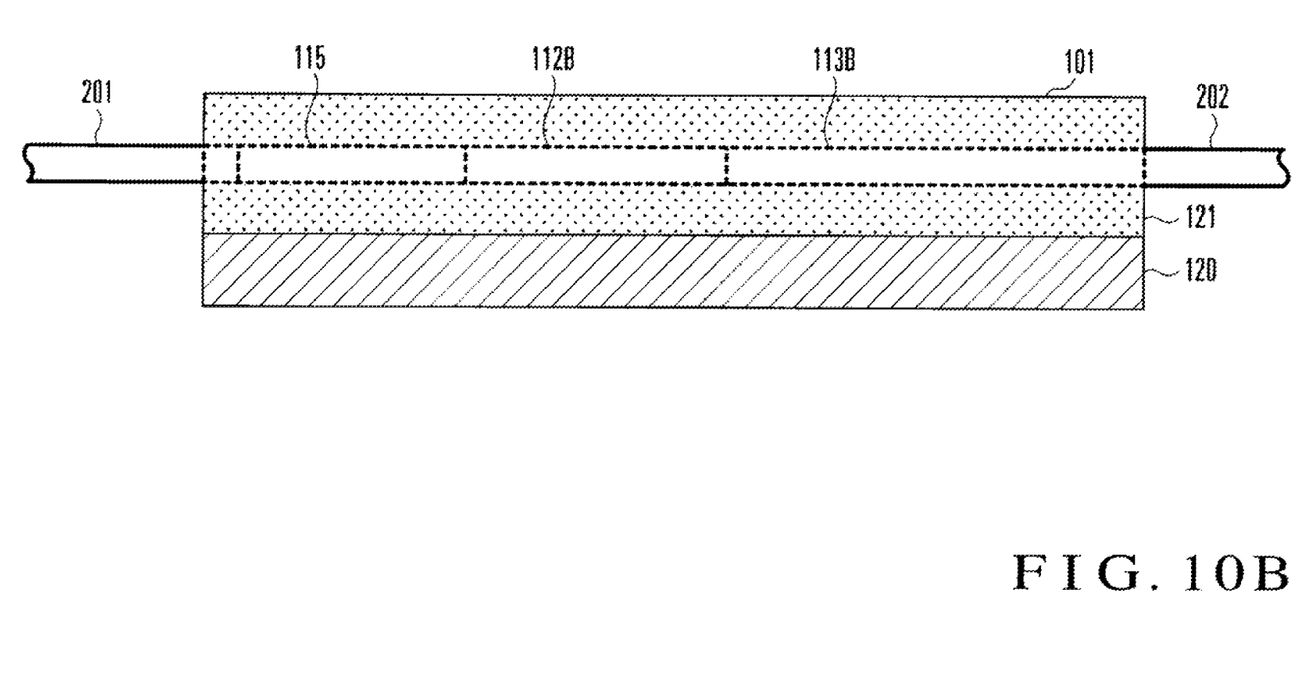
FIG. 10B is a front view showing the waveguide connecting structure according to the second exemplary embodiment of the present invention.

A waveguide connecting structure according to the second exemplary embodiment of the present invention will be explained below with reference to FIGS. 10A and 10B. FIGS. 10A and 10B are plan views showing the waveguide connecting structure according to the second exemplary embodiment of the present invention, in which the same reference numerals as in FIGS. 6A and 6B denote the same parts or similar parts.

The first exemplary embodiment has been explained by taking the case in which the MMI element 112 branches light from the input waveguide 201 as an example. This exemplary embodiment will be explained by taking the case in which a Y light branching element 115 branches light from an input waveguide 201 as an example.

In a waveguide connecting structure 101, the Y light branching element 115 is an optical element having a function of branching an electromagnetic field mode passing through the input waveguide 201 to two strip waveguides 112A and 112B at a power branching ratio of 50:50 such that the branched light components have the same phase. The Y light branching element 115 is made of a core formed in a cladding 121 on a substrate 120 and having a refractive index higher than that of the cladding 121. The core of the Y light branching element 115 has a rectangular sectional shape, and the width of the core input end and that of each of the two core output ends of the Y light branching element 115 are equal to a core width $W_1$ of the core output end of the input waveguide 201. Note that the Y light branching element 115 can be formed by using the known technique. Note also that the strip waveguides 112A and 112B and a twin-arm waveguide 113 are the same as those of the first exemplary embodiment, so a detailed explanation will be omitted.

In the waveguide connecting structure 101, therefore, the electromagnetic field mode passing through the input waveguide 201 is branched through the Y light branching element 115 to the two strip waveguides 112A and 112B at a power branching ratio of 50:50 such that the branched light components have the same phase. After that, the twin-arm waveguide 113 connects the light components of the two strip waveguides 112A and 112B to a slot waveguide 202.

In this case, the branching efficiency of the Y-branch is in many cases lower than that of the MMI element, but the present invention can simply be practiced by allowing a certain loss.

The invention claimed is:

1. A waveguide connecting structure comprising:
a light branching element which branches light from an input optical waveguide including one core into two branched light components having the same optical power and the same phase; and
a twin-arm waveguide including a pair of arm waveguides which output the light components branched by said light branching element to a slot waveguide including two cores arranged in parallel at a narrow spacing,
wherein said pair of arm waveguides have cores formed in a cladding on a substrate and having a refractive index higher than that of the cladding, and are formed such that a spacing between said pair of arm waveguides gradually narrows and becomes equal to a core spacing of said slot waveguide, from core input ends into which the branched light components enter toward core output ends from which the light components are output to said slot waveguide.

2. A waveguide connecting structure according to claim 1, wherein said pair of arm waveguides are formed into shapes axially symmetrical with respect to a center of said slot waveguide.

3. A waveguide connecting structure according to claim 1, wherein the cores of said pair of arm waveguides have a predetermined height, and the spacing between said pair of arm waveguides gradually narrows, and a core width of each of said pair of arm waveguides gradually narrows from a core width of said input waveguide to that of said slot waveguide in a bent portion not serving as a light branching portion from the core input ends to the core output ends.

4. A waveguide connecting structure according to claim 1, wherein said light branching element comprises one of an MMI element or a Y-branch element.

\* \* \* \* \*